(12) United States Patent
Mizushima et al.

(10) Patent No.: US 7,583,422 B2
(45) Date of Patent: Sep. 1, 2009

(54) HOLOGRAPHIC RECORDING MEDIUM AND HOLOGRAPHIC RECORDING AND REPRODUCING METHOD

(75) Inventors: Tetsuro Mizushima, Moriguchi (JP); Takuya Tsukagoshi, Sagamihara (JP); Hideaki Miura, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 246 days.

(21) Appl. No.: 10/568,594

(22) PCT Filed: Aug. 20, 2004

(86) PCT No.: PCT/JP2004/011974

§ 371 (c)(1),
(2), (4) Date: Feb. 17, 2006

(87) PCT Pub. No.: WO2005/022275

PCT Pub. Date: Mar. 10, 2005

(65) Prior Publication Data

US 2006/0221422 A1    Oct. 5, 2006

(30) Foreign Application Priority Data

Aug. 29, 2003    (JP) .............................. 2003-307076

(51) Int. Cl.
*G03H 1/02*    (2006.01)

(52) U.S. Cl. ..................... 359/3; 430/2; 359/22; 359/29

(58) Field of Classification Search .................. None
See application file for complete search history.

(56) References Cited

U.S. PATENT DOCUMENTS

| 4,179,182 | A | * | 12/1979 | Smith | ............................. 359/3 |
| 5,483,365 | A | * | 1/1996 | Pu et al. | ........................ 359/11 |
| 5,607,799 | A | * | 3/1997 | Moerner et al. | ................ 430/1 |
| 2006/0203315 | A1 | * | 9/2006 | Haga et al. | .................... 359/12 |

FOREIGN PATENT DOCUMENTS

| JP | A-01-107290 | 4/1989 |
| JP | A-02-052387 | 2/1990 |
| JP | A-02-296278 | 12/1990 |
| JP | 06274084 A * | 9/1994 |
| JP | A-07-272317 | 10/1995 |
| JP | A-07-320014 | 12/1995 |
| JP | A-2000-305442 | 11/2000 |
| JP | A-2000-338847 | 12/2000 |
| JP | A-2002-351288 | 12/2002 |

* cited by examiner

*Primary Examiner*—Arnel C Lavarias
(74) *Attorney, Agent, or Firm*—Oliff & Berridge, PLC

(57) ABSTRACT

A white-light reconstruction hologram and a Fourier hologram for data can be recorded in a same holographic recording medium. The holographic recording medium includes, in a substantially identical plane, a white-light reconstruction holographic recording layer region capable of forming a white-light reconstruction hologram, having a thickness of 2 μm to 80 μm, and a Fourier holographic recording layer region capable of multiplexed hologram recording, having a thickness of 100 μm to 2 cm.

8 Claims, 3 Drawing Sheets

HOLOGRAPHIC RECORDING MEDIUM AND HOLOGRAPHIC RECORDING AND REPRODUCING METHOD

TECHNICAL FIELD

The present invention relates to a holographic recording medium for holographically recording an interference fringe of an object beam and a reference beam or a holographic recording medium into which a hologram has been recorded and a holographic recording and reproducing method.

BACKGROUND ART

As a volume phase hologram, a white-light reconstruction hologram (a hologram reproducible by the light visible as white color by the naked eye, i.e., white light, the spectral distribution of which spreads over nearly the entire visible region), which is mainly used in security applications, and a Fourier transform hologram, which is used in data recording applications, have been proposed so far. These holograms are formed in separate recording media.

Meanwhile, there is a demand for a recording medium capable of recording both the white-light reconstruction hologram and Fourier transform hologram.

An exemplary application of this type of recording medium is that on one hand, the white-light reconstruction hologram guarantees the security of the recording medium, on the other hand, many data are recorded into this security guaranteed medium as Fourier transform holograms.

Holographic recording that records data as two-dimensional information is one of recording technology capable of storing large amounts of data and transferring the data at high speed. The holographic recording is performed in such a way that two-dimensional information is created by a spatial light modulator according to data to be recorded, after which it is condensed by a Fourier lens (Fourier-transformed) and guided to a recording medium as an object beam, where the object beam interferes with a reference beam.

In this process, for example, while sequentially changing the angle of the reference beam (angle multiplexing), the two-dimensional information created by the spatial light modulator is sequentially varied, whereby multiple two-dimensional information is recorded in a same volume in multiplexed form.

To reconstruct data recorded as holograms, a reference beam (or phase-conjugate beam) having the same condition as the one used when recording is irradiated to the recording medium to generate diffraction light, which is formed as a reconstructed image of the two-dimensional information through a Fourier lens. In contrast, white-light reconstruction holograms used in security and decoration applications include a type of holograms on which print materials and three-dimensional images are recorded by embossing its surface and other types, but all of these are recorded and reconstructed without performing a Fourier transformation. Accordingly, since the white-light reconstruction hologram and Fourier hologram differ from each other in their recording and reconstructing processes, it has been impossible to record both of them in a same recording medium.

DISCLOSURE OF THE INVENTION

The present invention addresses the above conventional problems, and an object of the invention is to provide a holographic recording medium that can record both a white-light reconstruction hologram and a Fourier hologram and a holographic recording and reproducing method.

As a result of diligent research, the present inventor has found that it is possible to record both a white-light reconstruction hologram and a Fourier hologram in a same holographic recording medium by forming a thinner white-light reconstruction holographic recording layer region and a thicker Fourier holographic recording layer region in a substantially identical plane.

In summary, the above-described objectives are achieved by the following aspects of the present invention.

(1) A holographic recording medium comprising, in a substantially identical plane, a white-light reconstruction holographic recording layer region capable of forming a white-light reconstruction hologram, having a thickness of 2 µm to 80 µm, and a Fourier holographic recording layer region capable of multiplexed hologram recording, having a thickness of 100 µm to 2 cm.

(2) The holographic recording medium according to (1), wherein the white-light reconstruction holographic recording layer region is 3 µm to 40 µm thick, and the Fourier holographic recording layer region is 100 µm to 5 mm thick.

(3) A holographic recording medium comprising, in a substantially identical plane, a white-light reconstruction holographic recording layer region, at least in part of which a white-light reconstruction hologram is formed, having a thickness of 2 µm to 80 µm, and a Fourier holographic recording layer region, at least in part of which multiplexed holograms are recorded, having a thickness of 100 µm to 2 cm.

(4) The holographic recording medium according to (3), wherein the white-light reconstruction holographic recording layer region is 3 µm to 40 µm thick, and the Fourier holographic recording layer region is 100 µm to 5 mm thick.

(5) The holographic recording medium according to (3) or (4), wherein a hologram formed in the white-light reconstruction holographic recording layer is a reflection hologram.

(6) A method of holographic recording comprising the step of irradiating, as an object beam, a two-dimensional pattern image created by a spatial light modulator to the white-light reconstruction holographic recording layer region in the holographic recording medium according to (1) or (2).

(7) The method of holographic recording according to (6), wherein the object beam is modulated by the spatial light modulator, is switched to an optical path different from an optical path used for irradiating the two-dimensional pattern image, is Fourier-transformed, and then is irradiated as an information beam to the Fourier holographic recording layer region in the holographic recording medium.

BEST MODE FOR CARRYING OUT THE INVENTION

Figure 1:
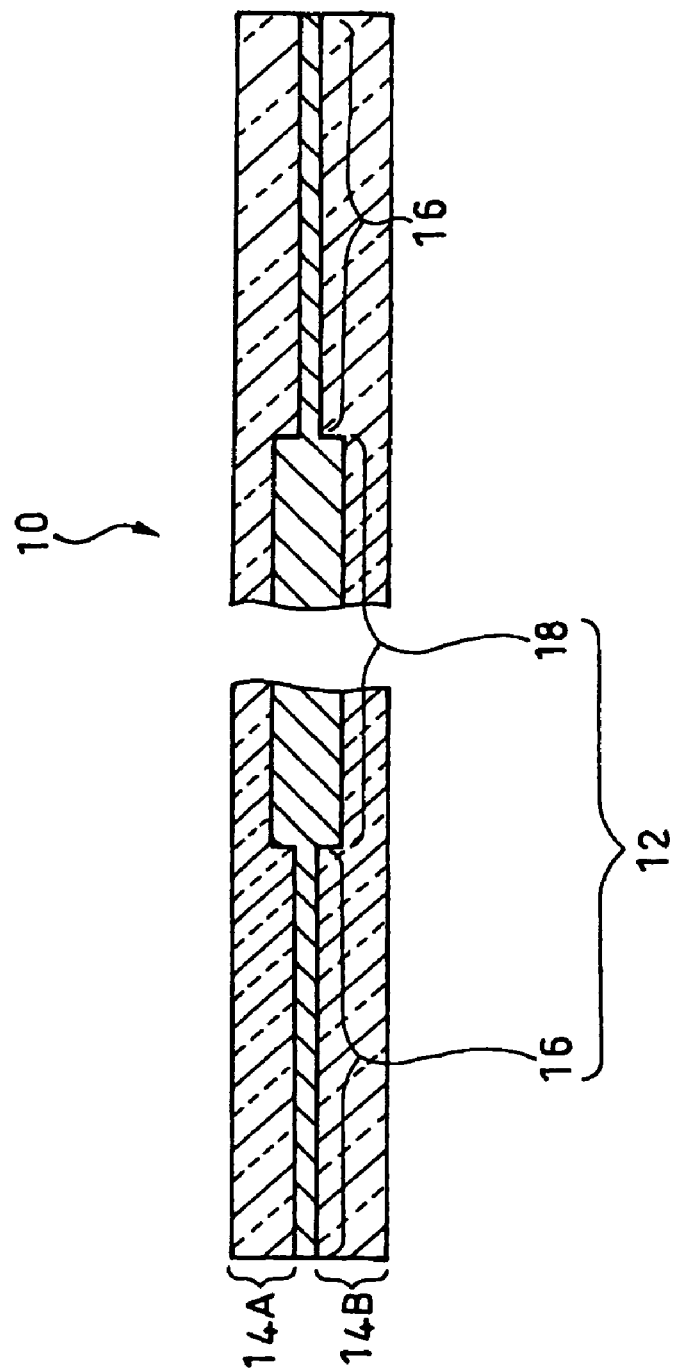
FIG. 1 is an enlarged cross-sectional view schematically illustrating the holographic recording medium according to an embodiment of the invention.

A white-light reconstruction holographic recording layer region capable of forming a white-light reconstruction hologram, having a thickness of 3 μm to 40 μm, and a Fourier holographic recording layer region capable of multiplexed holographic recording, having a thickness of 100 μm to 5 mm, are provided in a substantially identical plane to constitute a holographic recording medium, thereby achieving an object of recording both a white-light reconstruction hologram and a Fourier hologram in a same recording medium.

An embodiment of the invention will now be described in detail with reference to the drawings.

First, a holographic recording medium 10 according to the embodiment of the invention will be described with reference to FIG. 1.

The holographic recording medium 10 is integrally formed such that a single recording layer 12 comprising a holographic recording material is sandwiched from both sides by two substrates 14A and 14B.

The recording layer 12 comprises a white-light reconstruction holographic recording layer region 16 capable of forming a white-light reconstruction hologram, having a thickness of 2 μm to 80 μm, and a Fourier holographic recording layer region 18 capable of multiplexed holographic recording, having a thickness of 100 μm to 2 cm.

The pair of substrates 14A and 14B comprise glass or plastic on which anti-reflection coating (AR-coating) for a recording and reproducing wavelength is formed so as to be transparent thereto. As shown in FIG. 1, each of the substrates 14A and 14B has different thicknesses with respect to the white-light reconstruction holographic recording layer region 16 and Fourier holographic recording layer region 18, although it has a single flat surface on its entire outer side.

The holographic recording material of the recording layer 12 includes, for example, a material comprising a photopolymer. The holographic recording materials of the white-light reconstruction holographic layer region 16 and Fourier holographic recording region 18 may be the same or may be different from each other.

The reason why the thickness of the white-light reconstruction holographic recording layer region 16 is set to 2 μm or more is that if it is less than 2 μm, a hologram is difficult to be seen. The reason why the thickness of the Fourier holographic recording layer region 18 is set to 100 μm or more is that this thickness is the minimum requirement to record data in multiplexed form; it is preferable, however, that the thickness does not exceed 2 cm because if it exceeds 2 cm, the interchangeability and portability of the recording medium will be impaired.

These values have been determined from tables 1 and 2 showing the measurement results of the experiments described later.

TABLE 1

| Recording layer thickness (μm) | Diffraction efficiency (%) | Viewing angle (degree) |
|---|---|---|
| 1 | 1.4 | >90 |
| 2 | 5.3 | >90 |
| 3 | 12 | >90 |
| 5 | 26.8 | >90 |
| 10 | 65.5 | 89 |
| 20 | 81.2 | 44.4 |
| 40 | 80.8 | 22 |
| 60 | 78.9 | 14.6 |

TABLE 1-continued

| Recording layer thickness (μm) | Diffraction efficiency (%) | Viewing angle (degree) |
|---|---|---|
| 80 | 76.6 | 10.9 |
| 100 | 74.1 | 8.8 |
| 150 | 69.3 | 5.9 |

TABLE 2

| Recording layer thickness (μm) | Multiplexing level |
|---|---|
| 2 | 2 |
| 20 | 18 |
| 50 | 46 |
| 80 | 88 |
| 100 | 137 |
| 200 | 549 |
| 300 | 1236 |
| 500 | 3433 |
| 1000 | 13732 |
| 5000 | 343311 |

As shown in table 2, the recording layer with a thickness of 5 mm can obtain a sufficient multiplexing level exceeding three hundred thousand. It is preferable, however, that the thickness does not exceed 5 mm because if it exceeds 5 mm, the mechanical accuracies of the driver and recording medium become severe, so that it becomes difficult to increase the capacity.

From the viewpoints of the diffraction efficiency and viewing angle, it is preferable that the thickness of the white-light reconstruction holographic recording layer is set to 3 μm to 40 μm to obtain a diffraction efficiency of 10% or more and a viewing angle of 20 degrees or more.

Next, a process will be described in which holographic recording is performed on the above holographic recording medium 10 to form a white-light reconstruction hologram and a Fourier hologram.

Figure 2:
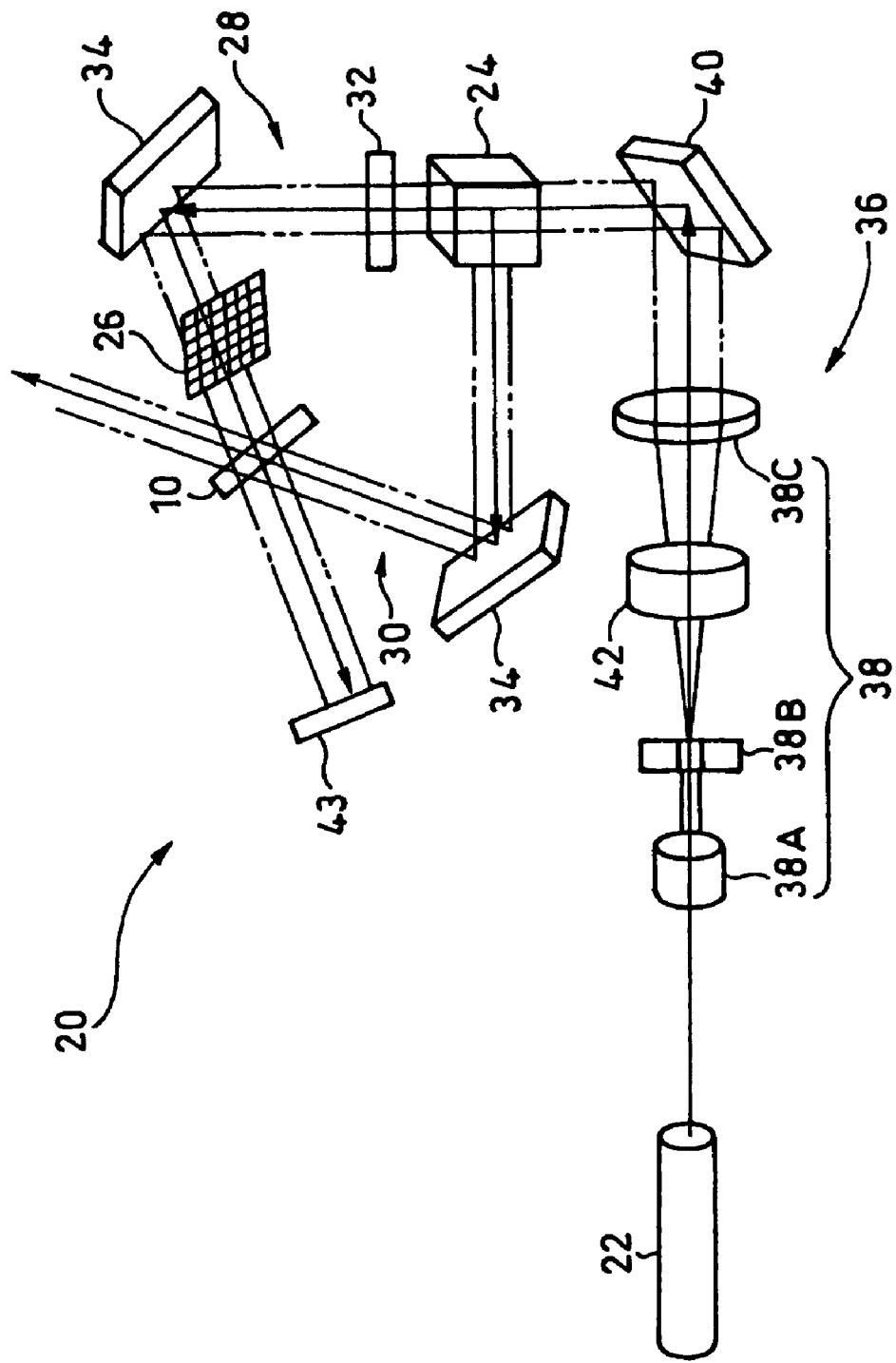
FIG. 2 is an optical system diagram of a holographic recording and reproducing apparatus for forming a white-light reconstruction hologram in the holographic recording medium in FIG. 1.

As shown in FIG. 2, a holographic recording and reproducing apparatus 20 for recording a hologram into the holographic recording medium 10 and reconstructing the hologram comprises: a laser light source 22; a beam splitter 24 for splitting a laser beam emitted from the laser light source 22 into an object beam and a reference beam; an object optical system 28 including a spatial light modulator 26 that modulates the split object beam according to image information to be recorded; and a reference optical system 30 that guides the reference beam split at the beam splitter 24 to the holographic recording medium 10, wherein the object beam from the object optical system 28 and the reference beam from the reference optical system 30 illuminate the white-light reconstruction holographic recording layer region 16 and interfere with each other, thereby forming a white-light reconstruction hologram.

In the object optical system 28, a light shutter 32 is provided between the beam splitter 24 and the spatial light modulator 26. The object optical system 28 and the reference optical system 30 each have a total reflection mirror 34.

In a light source optical system 36 configured between the laser light source 22 and the beam splitter 24, a beam expander 38 for expanding a laser beam emitted from the laser light source 22 and a total reflection mirror 40 are provided. The beam expander 38 comprises a collimating lens 38A, another collimating lens 38C, and a pinhole 38B functioning as a spatial filter. Further, a light shutter 42 is disposed between the pinhole 38B and the collimating lens 38C.

The numeral 43 in FIG. 2 indicates a power meter that measures the intensity of the object beam having passed through the holographic recording medium 10.

In the holographic recording and reproducing apparatus 20, when forming a white-light reconstruction hologram in the white-light reconstruction holographic recording layer region 16, the recording is performed without disposing a Fourier lens on the optical paths as shown in FIG. 2.

Figure 3:
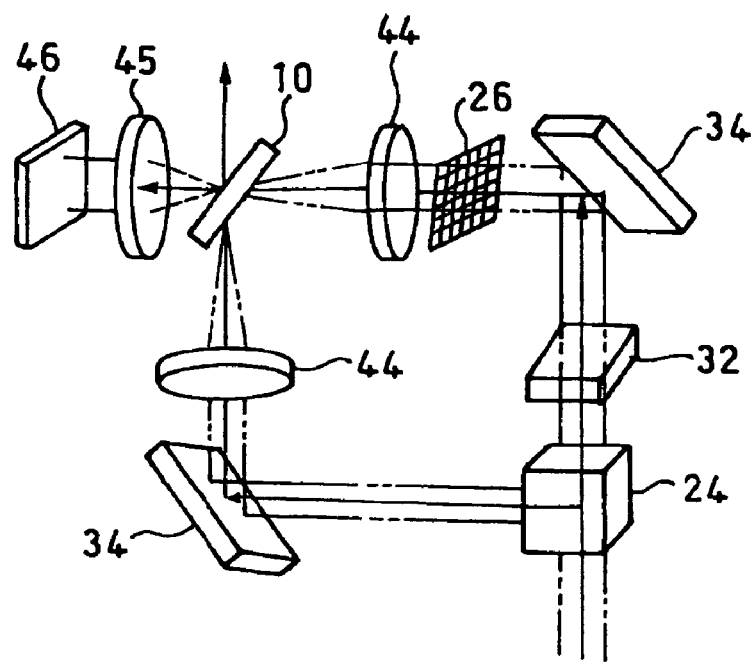
FIG. 3 is an optical system diagram illustrating the essential part of the structure with which a Fourier hologram is formed in a Fourier holographic recording layer region in the holographic recording reproducing apparatus in FIG. 2.

In contrast, in the holographic recording and reproducing apparatus 20, when data are recorded as multiplexed Fourier holograms into the Fourier holographic recording layer region 18, as shown in FIG. 3, the recording is performed through Fourier lenses 44 disposed between the spatial light modulator 26 and the holographic recording medium 10 and between the total reflection mirror 34 in the reference optical system 30 and the holographic recording medium 10, respectively.

A holographic recording medium 50 (see FIG. 4) on which recording has been completed includes a white-light reconstruction hologram recorded in its white-light reconstruction holographic recording layer region 16 and a Fourier hologram recorded in its Fourier holographic recording layer region 18.

Figure 4:
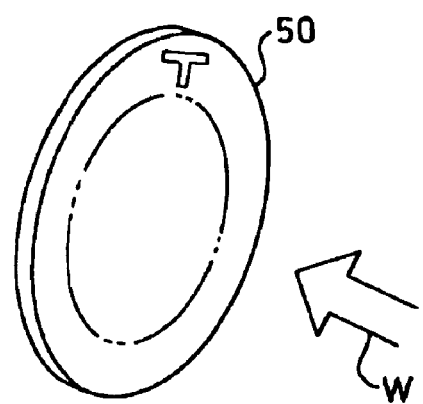
FIG. 4 is a perspective view describing how a white-light reconstruction hologram is reconstructed from a holographic recording medium.

The white-light reconstruction hologram recorded in the white-light reconstruction recording layer region 16 of the holographic recording medium 50 can be read by irradiating white-light (W) as shown in FIG. 4.

To reconstruct data from a Fourier hologram recorded in the Fourier holographic recording layer region 18, for example, the Fourier lenses 44 are set in the holographic recording and reproducing apparatus 20 in FIG. 2 as shown in FIG. 3. Then, the light shutter 32 closes the optical path of the object optical system 28 to irradiate the reference beam to the holographic recording medium 50 only from the reference optical system 30. Diffraction light is thereby generated from the Fourier holographic recording layer region 18, is made incident on a CCD 46 through a reverse Fourier lens 45 and then is read out, whereby the data can be reconstructed.

It is preferable that a hologram formed in the white-light reconstruction holographic recording layer region 16 is especially recorded as a reflection hologram (the angle $\theta$ between the object beam and the reference beam is in the range of 90° to 180°) so as to be visible under white light. The reflection hologram can reduce the blurring of a white-light reconstruction hologram and make the viewing angle of a two-dimensional pattern image wider, thereby enhancing decorativity.

When recording a hologram that can be visible under white light, if the thickness of the recording layer in which the hologram is recorded exceeds 80 μm, the selectivity is increased with which the object beam is not diffracted. Therefore, the reconstruction becomes possible only at limited angles and wavelengths, so that the hologram can be invisible under white light that includes various wavelengths. Accordingly, for use in decoration and the like, a white-light reconstruction holographic recording material preferably has a thickness of 80 μm or less so that an image can be seen from various angles.

When recording a white-light reconstruction hologram and a Fourier hologram into the holographic recording medium 10, the recordings are performed by the different optical systems as shown in FIG. 2 and FIG. 3. However, if, for example, the Fourier lenses 44 shown in FIG. 3 are provided so as to be freely attachable to and detachable from the object optical system 28 and the reference optical system 30, the same spatial light modulator 26 can be used to record a white-light reconstruction hologram and a Fourier hologram into the respective white-light reconstruction holographic recording layer region 16 and Fourier holographic recording layer region 18.

The inventor experimentally measured the relationship among the thickness of the white-light reconstruction holographic recording layer region 16, diffraction efficiency, and viewing angle, under the following conditions.

A recording medium was fabricated by sandwiching a holographic recording material between the substrates 14A and 14B having an uneven shape like the one shown in FIG. 1, wherein a glass substrate with anti-reflection coating was used for each substrate. With this recording medium, the visibility and image brightness of the white-light reconstruction hologram region (white-light reconstruction holographic recording layer region) were evaluated while changing the thickness of each of the recording regions by changing the step height of the substrate and the spacer thickness between the substrates. As a recording material, the material comprising a photopolymer and having a maximum refractive index modulation of 0.02 was used.

A white-light reconstruction hologram was recorded using the reflection hologram recording optical systems shown in FIG. 2.

Using the Nd:YAG laser (532 nm), its laser beam was processed by a spatial filter, after which it was expanded by a beam expander and then was divided by a beam splitter into an object beam and a reference beam. Intensity modulation was given to the object beam by a spatial light modulator to form a character pattern like the one shown in FIG. 4 and other patterns. The optical systems were adjusted so that the intensity of bright part of the object beam became equal to the intensity of the reference beam.

Recording was performed by irradiating both the object and reference beams, after which the diffraction efficiency was measured by irradiating only the reference beam. In addition, the recording medium was rotated in the horizontal direction to measure the range of angles in which the image of the object beam was able to be observed.

These measurement results are shown in the above-described table 1.

Both high diffraction efficiency and a large viewing angle are required to reconstruct the image under white light. To reconstruct a highly decorative image, a diffraction efficiency of 5% or more and a viewing angle of 10 degrees or more are preferable, which corresponds to a thickness of the recording layer in the range of 2 μm to 80 μm. To reconstruct a more highly decorative image, a thickness in the range of 3 μm to 40 μm is preferable.

Possible multiplexing levels were estimated in optical systems using Fourier lenses, like the ones shown in FIG. 3. Angle multiplexing recording was performed in which an angle of the recording medium changes ±30 degrees in the horizontal direction and an angle of the reference beam changes ±10 degrees in the vertical direction.

The results are shown in the table 2.

It is appreciated that a multiplexing level of 100 pages or more, which is required for realizing high capacity, is obtainable by making the thickness of the recording layer greater than or equal to 100 μm. It is also appreciated that higher multiplexing level is possible by making the thickness of the recording layer more than several hundred micrometers.

With a recording medium having the Fourier holographic recording region with a recording thickness of 100 μm, it has been confirmed that a multiplexing level of 100 pages or more is obtainable.

As described above, the white-light reconstruction holographic recording region is formed to be 2 μm to 80 μm thick, and the Fourier holographic recording region in which data are recording is formed to be greater than or equal to 100 μm thick, thereby obtaining a holographic recording medium that is abundantly decorative and capable of storing a larger amount of data.

The present invention is naturally applicable not only to a holographic recording medium in which a hologram has not yet formed, but also to the one in which a hologram has already formed at least in a part of the white-light reconstruction holographic recording layer region or at least in a part of the Fourier holographic recording layer region.

INDUSTRIAL APPLICABILITY

According to the invention, a thinner white-light reconstruction holographic recording layer region and a thicker Fourier holographic recording layer region are provided in a same holographic recording medium, thereby obtaining an effect of enabling a white-light reconstruction hologram and a Fourier hologram to be formed in the same holographic recording medium.

The invention claimed is:

1. A holographic recording medium comprising, in a substantially identical plane,
   a single recording layer comprising a holographic recording material sandwiched from both sides by two substrates having an uneven shape including a step in thickness; and
   the single recording layer having a white-light reconstruction holographic recording layer region and a Fourier holographic recording layer region,
   the white-light reconstruction holographic recording layer region being capable of forming a white-light reconstruction hologram and having a thickness of 2 μm to 80 μm,
   the Fourier holographic recording layer region being capable of multiplexed hologram recording and having a thickness of 100 μm to 2 cm, and
   the thickness of each of the white-light reconstruction holographic recording layer region and Fourier holographic recording layer region being changed by the step height of the two substrates.

2. The holographic recording medium according to claim 1, wherein the white-light reconstruction holographic recording layer region is 3 μm to 40 μm thick, and the Fourier holographic recording layer region is 100 μm to 5 mm thick.

3. A holographic recording medium comprising, in a substantially identical plane,
   a single recording layer comprising a holographic recording material sandwiched from both sides by two substrates having an uneven shape including a step in thickness; and
   the single recording layer having a white-light reconstruction holographic recording layer region and a Fourier holographic recording layer region,
   the white-light reconstruction holographic recording layer region having a thickness of 2 μm to 80 μm and a white-light reconstruction hologram being formed in at least a part of the white-light reconstruction holographic recording layer region,
   the Fourier holographic recording layer region having a thickness of 100 μm to 2 cm and multiplexed holograms being recorded in at least a part of the Fourier holographic recording layer region, and
   the thickness of each of the white-light reconstruction holographic recording layer region and Fourier holographic recording layer region being changed by the step height of the two substrates.

4. The holographic recording medium according to claim 3, wherein the white-light reconstruction holographic recording layer region is 3 μm to 40 μm thick, and the Fourier holographic recording layer region is 100 μm to 5 mm thick.

5. The holographic recording medium according to claim 4, wherein a hologram formed in the white-light reconstruction holographic recording layer is a reflection hologram.

6. The holographic recording medium according to claim 3, wherein a hologram formed in the white-light reconstruction holographic recording layer is a reflection hologram.

7. A method of holographic recording comprising the step of irradiating, as an object beam, a two-dimensional pattern image created by a spatial light modulator to a white-light reconstruction holographic recording layer region in a holographic recording medium comprising, in a substantially identical plane, the white-light reconstruction holographic recording layer region capable of forming a white-light reconstruction hologram, having a thickness of 2 μm to 80 μm, and a Fourier holographic recording layer region capable of multiplexed hologram recording, having a thickness of 100 μm to 2 cm, the object beam is modulated by the spatial light modulator, is switched to an optical path different from an optical path used for irradiating the two-dimensional pattern image, is Fourier-transformed, and then is irradiated as an information beam to the Fourier holographic recording layer region in the holographic recording medium.

8. The method of holographic recording according to claim 7, wherein the white-light reconstruction holographic recording layer region is 3 μm to 40 μm thick, and the Fourier holographic recording layer region is 100 μm to 5 mm thick in the holographic recording medium.

* * * * *